United States Patent
Hasegawa

(10) Patent No.: US 11,827,308 B2
(45) Date of Patent: Nov. 28, 2023

(54) THREE WHEELED ELECTRIC CARGO TRANSPORTER

(71) Applicant: Honda Motor Co., Ltd., Tokyo (JP)

(72) Inventor: Toshiyuki Hasegawa, Durham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 17/462,201

(22) Filed: Aug. 31, 2021

(65) Prior Publication Data
US 2023/0060277 A1  Mar. 2, 2023

(51) Int. Cl.
*B62K 5/027* (2013.01)
*B60K 7/00* (2006.01)

(52) U.S. Cl.
CPC ............ *B62K 5/027* (2013.01); *B60K 7/0007* (2013.01)

(58) Field of Classification Search
CPC .... B62K 5/027; B62K 2204/00; B62K 3/002; B60K 7/0007
See application file for complete search history.

(56) References Cited

U.S. PATENT DOCUMENTS

| | | | |
|---|---|---|---|
| 3,794,351 A | 2/1974 | Cudmore | |
| 4,874,055 A * | 10/1989 | Beer | B60L 50/66 180/215 |
| 6,267,190 B1 * | 7/2001 | Micheletti | B62K 3/002 180/196 |
| 7,946,373 B2 | 5/2011 | Gibson | |
| 10,800,476 B1 * | 10/2020 | Thienphrapa | B62J 9/14 |
| 11,008,061 B2 | 5/2021 | Newby et al. | |
| 2003/0094315 A1 * | 5/2003 | White | B60L 8/00 180/2.2 |
| 2009/0020369 A1 * | 1/2009 | Warachka | B66F 9/08 187/222 |
| 2013/0281249 A1 * | 10/2013 | Mimura | B62K 5/027 475/150 |
| 2014/0311815 A1 * | 10/2014 | Reck | B62K 7/04 180/210 |
| 2015/0068828 A1 * | 3/2015 | Delgatty | B62J 7/04 180/210 |

(Continued)

FOREIGN PATENT DOCUMENTS

| | | |
|---|---|---|
| CN | 2051951 U | 1/1990 |
| CN | 105730582 A * | 7/2016 |

(Continued)

OTHER PUBLICATIONS

Pang M, 'Machine Translation of CN 106672147 Obtained Jan. 11, 2023', May 17, 2017, Entire Document. (Year: 2017).*

*Primary Examiner* — Jason D Shanske
*Assistant Examiner* — Matthew James O'Neill
(74) *Attorney, Agent, or Firm* — Plumsea Law Group, LLC

(57) ABSTRACT

A three wheeled electric cargo transporter is provided. The electric cargo transporter has a front wheel including an electric motor inside a hub of the front wheel. The electric cargo transporter also has a rear platform including a base and a pair of rear wheels. The electric cargo transporter further has an arm assembly including a pair of parallel arm bars, a lower crossbar, and an upper crossbar. The electric cargo transporter also has a trailing shaft connected to the base of the rear platform at a first end and connected to the lower crossbar of the arm assembly at an opposite second end.

20 Claims, 15 Drawing Sheets

(56) References Cited

U.S. PATENT DOCUMENTS

| | | | | |
|---|---|---|---|---|
| 2016/0096576 A1* | 4/2016 | Gotfrid | ............... | B62K 15/006 |
| | | | | 280/641 |
| 2016/0229485 A1* | 8/2016 | Hadley | ................. | B62K 5/027 |
| 2018/0043958 A1* | 2/2018 | Kama | .................... | B62K 25/02 |
| 2019/0225294 A1* | 7/2019 | Schneider | ................ | B62J 43/16 |
| 2020/0324844 A1* | 10/2020 | MacDonald | ............... | B62J 9/30 |
| 2022/0324285 A1* | 10/2022 | Wilcox | ................... | B60G 3/20 |

FOREIGN PATENT DOCUMENTS

| | | | | | |
|---|---|---|---|---|---|
| CN | 206476000 U | * | 9/2017 | | |
| CN | 206476011 U | | 9/2017 | | |
| CN | 206476019 U | | 9/2017 | | |
| CN | 206476022 U | | 9/2017 | | |
| CN | 206813189 U | | 12/2017 | | |
| CN | 108284903 A | * | 7/2018 | ............ | B62D 33/02 |
| CN | 106672147 B | | 10/2019 | | |
| CN | 111071377 A | * | 4/2020 | | |
| EP | 2426042 B1 | | 2/2014 | | |
| WO | 2014146580 A1 | | 9/2014 | | |

\* cited by examiner

THREE WHEELED ELECTRIC CARGO TRANSPORTER

BACKGROUND

This disclosure relates generally to vehicles, and in particular to a three wheeled electric cargo transporter.

Recently, a variety of electric personal transportation devices, such as electric mopeds, electric bicycles, and electric scooters, have become more popular. These types of electric personal transportation devices may be particularly popular for shorter trips in a city environment due to their compact size, ease of use, mobility, and the fact that they may be folded as needed for ease of portability. However, these electric personal transportation devices are typically focused on transporting people and offer very little cargo space or ability to carry large objects.

Accordingly, there is a need in the art for an electric powered cargo transporter.

SUMMARY

In one aspect, an electric cargo transporter is provided. The electric cargo transporter having a front wheel including an electric motor inside a hub of the front wheel. The electric cargo transporter also having a rear platform including a base and a pair of rear wheels. The electric cargo transporter further having an arm assembly including a pair of parallel arm bars, a lower crossbar, and an upper crossbar. The electric cargo transporter also having a trailing shaft connected to the base of the rear platform at a first end and connected to the lower crossbar of the arm assembly at an opposite second end.

In another aspect, an electric cargo transporter is provided. The electric cargo transporter having a first portion including a front wheel including an electric motor inside a hub of the front wheel and an arm assembly including a pair of parallel arm bars, a lower crossbar, and an upper crossbar. The electric cargo transporter also having a second portion comprising a rear platform including a base, a pair of rear wheels, and a trailing shaft. The electric cargo transporter further having a connection mechanism attaching the first portion to the second portion. The electric cargo transporter is articulated at the connection mechanism between the first portion and the second portion.

In another aspect, an electric cargo transporter configured to be transitioned between a riding configuration and a storage configuration is provided. The electric cargo transporter having a front wheel including an electric motor inside a hub of the front wheel and a rear platform including a base and a pair of rear wheels. The electric cargo transporter also having an arm assembly including a pair of parallel arm bars, a lower crossbar, and an upper crossbar. The electric cargo transporter further having a trailing shaft connected to the base of the rear platform at a first end and connected to a connection mechanism on the arm assembly at an opposite second end when the electric cargo transporter is in a riding configuration.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a three wheeled electric cargo transporter are described herein that allow a user to transport items in a cargo area of the three wheeled electric cargo transporter. For example, embodiments of the three wheeled electric cargo transporter described herein may be used for camping, recreational uses, deliveries, yard work, at events or businesses, for moving furniture, boxes, or other goods, etc. The three wheeled electric cargo transporter of the example embodiments is also convertible to an upright storage configuration so that when the three wheeled electric cargo transporter is not being used, it may be conveniently stored without taking up a large amount of space.

The example embodiments are described herein with reference to an electric powered three wheeled cargo transporter. In an example embodiment, the three wheeled electric cargo transporter is in the form of a scooter. However, the principles of the example embodiments described herein may be applied to other types of cargo transporters having different forms.

Figure 1:
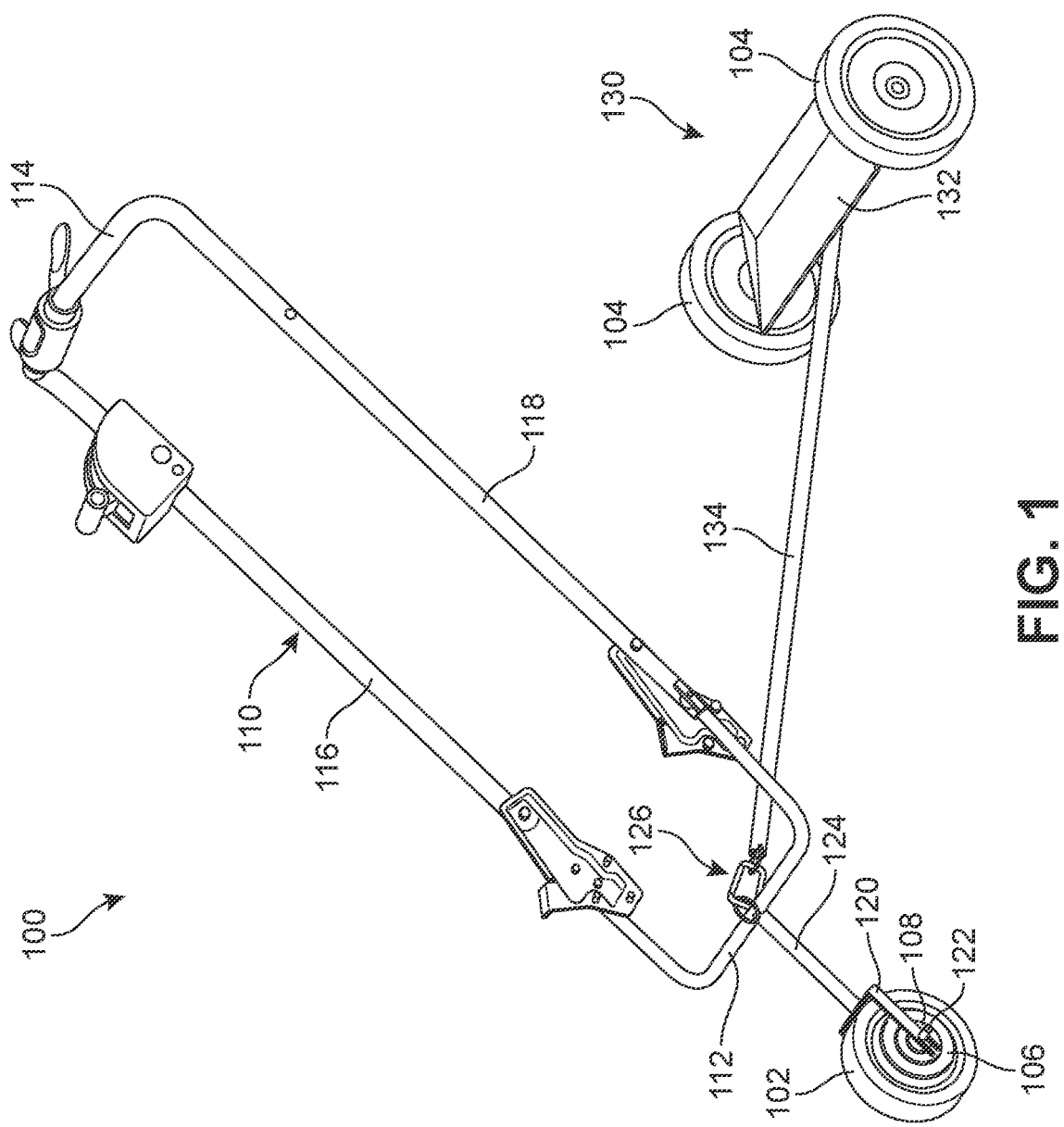
FIG. 1 is an isometric view of an example embodiment of a three wheeled electric cargo transporter in accordance with aspects of the present disclosure.

Referring now to FIG. 1, an example embodiment of a three wheeled electric cargo transporter 100 (e.g., also referred to herein as "transporter 100") is shown. In some embodiments, transporter 100 may be transitioned or converted between a riding configuration in which transporter 100 may be operated or ridden by a user to a storage configuration in which components of transporter 100 are folded to an upright storage position to minimize the footprint of transporter 100. With this arrangement, transporter 100 may be easily and conveniently kept in the upright storage configuration until it is needed and may be quickly transitioned to the riding configuration. As shown in FIG. 1, transporter 100 is in the riding configuration.

In an example embodiment, transporter 100 includes a front wheel 102 and a pair of rear wheels 104. In this embodiment, front wheel 102 is driven by an electric motor 106 contained within a hub 108 of front wheel 102. Electric motor 106 in hub 108 of front wheel 102 provides the driving force for moving transporter 100. Rear wheels 104 are undriven wheels, also referred to as trailer wheels, and are free to rotate as transporter 100 moves. That is, rear wheels 104 are not driven by a motor or other driving force and are instead pulled by the driving force of electric motor 106 in hub 108 of front wheel 102. In some embodiments, electric motor 106 in hub 108 may have a regenerative braking mechanism or function that is configured to apply a braking force to transport 100. With this configuration, electric motor 106 may provide both driving and braking forces to transporter 100.

In some embodiments, three wheeled electric cargo transporter 100 may include an arm assembly 110 that provides a frame for transporter 100. In an example embodiment, arm assembly 110 has an approximately rectangular shape formed by a plurality of tubes. In this embodiment, arm assembly 110 includes a lower crossbar 112 extending in a substantially horizontal direction at one end of arm assembly 110 and an opposite upper crossbar 114 also extending in a substantially horizontal direction at an opposite end of arm assembly 110. In some embodiments, lower crossbar 112 and upper crossbar 114 are approximately parallel to each other at the opposite ends of arm assembly 110.

In an example embodiment, arm assembly 110 also includes a pair of parallel arm bars, including a first arm bar 116 on one side of arm assembly 110 and an opposite second arm bar 118 on the other side of arm assembly 110. In this embodiment, the pair of parallel arm bars (e.g., first arm bar 116 and second arm bar 118) extend generally in an angle vertical direction such that the ends of first arm bar 116 and second arm bar 118 that are closer to lower crossbar 112 are below the ends of first arm bar 116 and second arm bar 118 that are closer to upper crossbar 114. Together, lower crossbar 112, upper crossbar 114, first arm bar 116, and second arm bar 118 define the rectangular shape of arm assembly 110.

In an example embodiment, front wheel 102 of transporter 100 is attached via a fork 120 that connects to the opposite ends of an axle 122 of front wheel 102. As shown in FIG. 1, fork 120 connects to a front shaft 124 that is fixedly attached at the middle of lower crossbar 112. In this embodiment, front shaft 124 is fixedly attached to a bottom side of lower crossbar 112. In an example embodiment, transporter 100 also includes a rear platform 130 that includes a base 132 and a trailing shaft 134. Base 132 provides a flat surface or area for a user or rider of transporter 100 to stand while operating transporter 100. Trailing shaft 134 is attached to base 132 of rear platform 130 at one end and is configured to removably connect to arm assembly 110 via a connection mechanism 126 at the opposite end.

Figure 2:
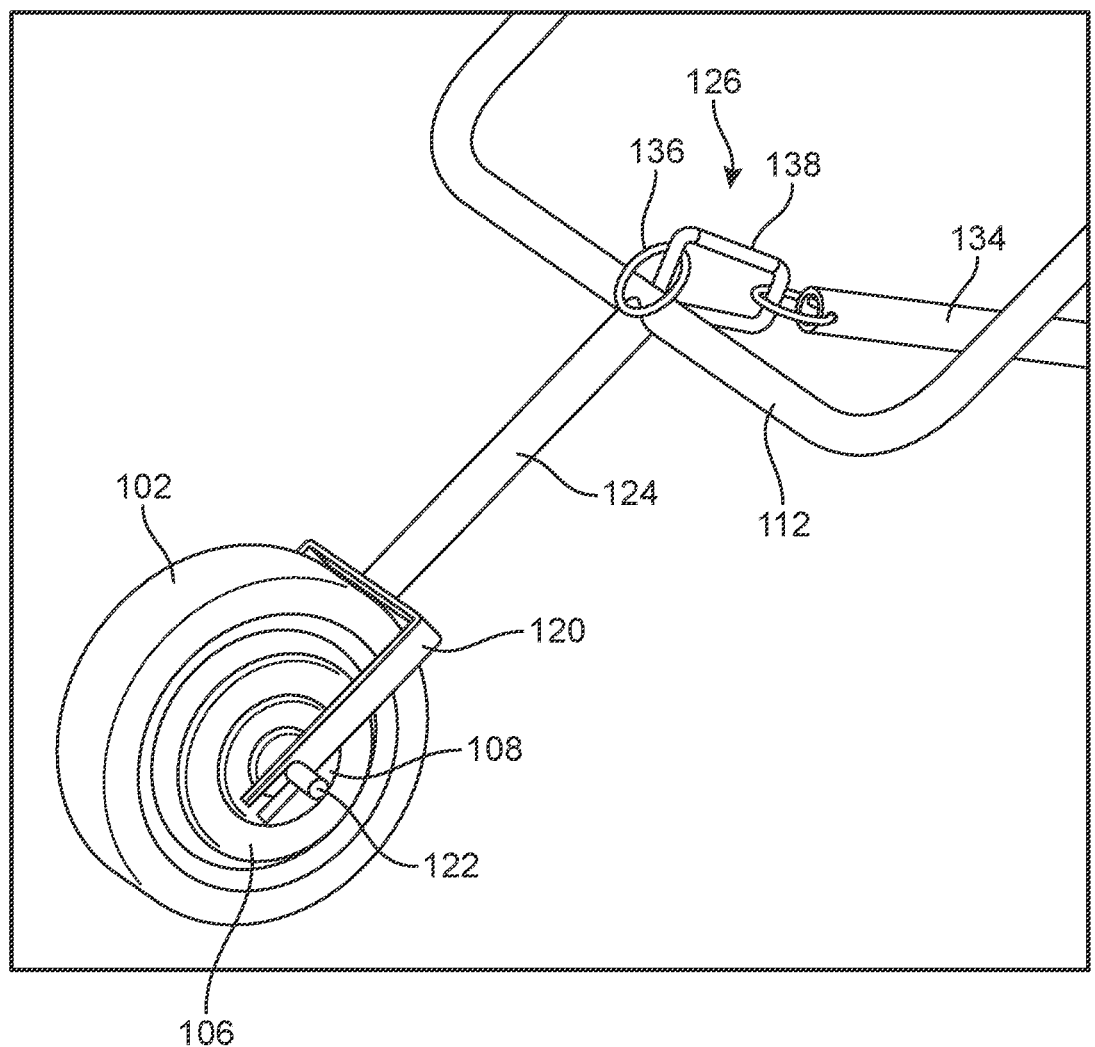
FIG. 2 is an enlarged view of a powered front wheel of the three wheeled electric cargo transporter of FIG. 1 in accordance with aspects of the present disclosure.

Referring now to FIG. 2, an enlarged view of powered front wheel 102 and connection mechanism 126 is shown. In one embodiment, connection mechanism 126 includes an attachment member 136 that is located on a top side of lower crossbar 112 opposite front shaft 124 and a coupler 138 that is disposed at an end of trailing shaft 134 opposite from base 132 of rear platform 130. In this embodiment, attachment member 136 of connection mechanism 126 is fixedly attached at the middle of lower crossbar 112 on the top side. In some embodiments, coupler 138 is fixedly attached at the end of trailing shaft 134. In an example embodiment, coupler 138 is configured to removably mate or connect to attachment member 136 to temporarily attach rear platform 130, including trailing shaft 134, base 132, and rear wheels 104, to arm assembly 110.

In an example embodiment, connection mechanism 126 allows coupler 138 to rotate or pivot relative to attachment member 136 so that rear platform 130, including trailing shaft 134, base 132, and rear wheels 104, may rotate or pivot relative to arm assembly 110. With this arrangement, when a user or rider of transporter 100 turns arm assembly 110 to rotate front wheel 102, coupler 138 swivels relative to attachment member 136 so that rear platform 130 retains its initial orientation. As transporter 100 then moves forward, rear platform 130 will change orientation to follow or trail front wheel 102. That is, transporter 100 is articulated at connection mechanism 126 between a first portion (e.g., including front wheel 102 and arm assembly 110) and a second portion (e.g., rear platform 130, including trailing shaft 134, base 132, and rear wheels 104). This articulated arrangement between the first portion and the second portion allows or permits transporter 100 to maneuver and turn while being driven by front wheel 102.

In one embodiment, attachment member 136 is in the form of a ring or loop that is fixedly attached to the top side of lower crossbar 112 and coupler 138 is in the form of a carabiner or snap ring that removably attaches or connects to the ring or loop. With this arrangement, coupler 138 may be connected to attachment member 136 in a way that allows rear platform 130 to rotate or pivot at connection mechanism 126.

Figure 3:
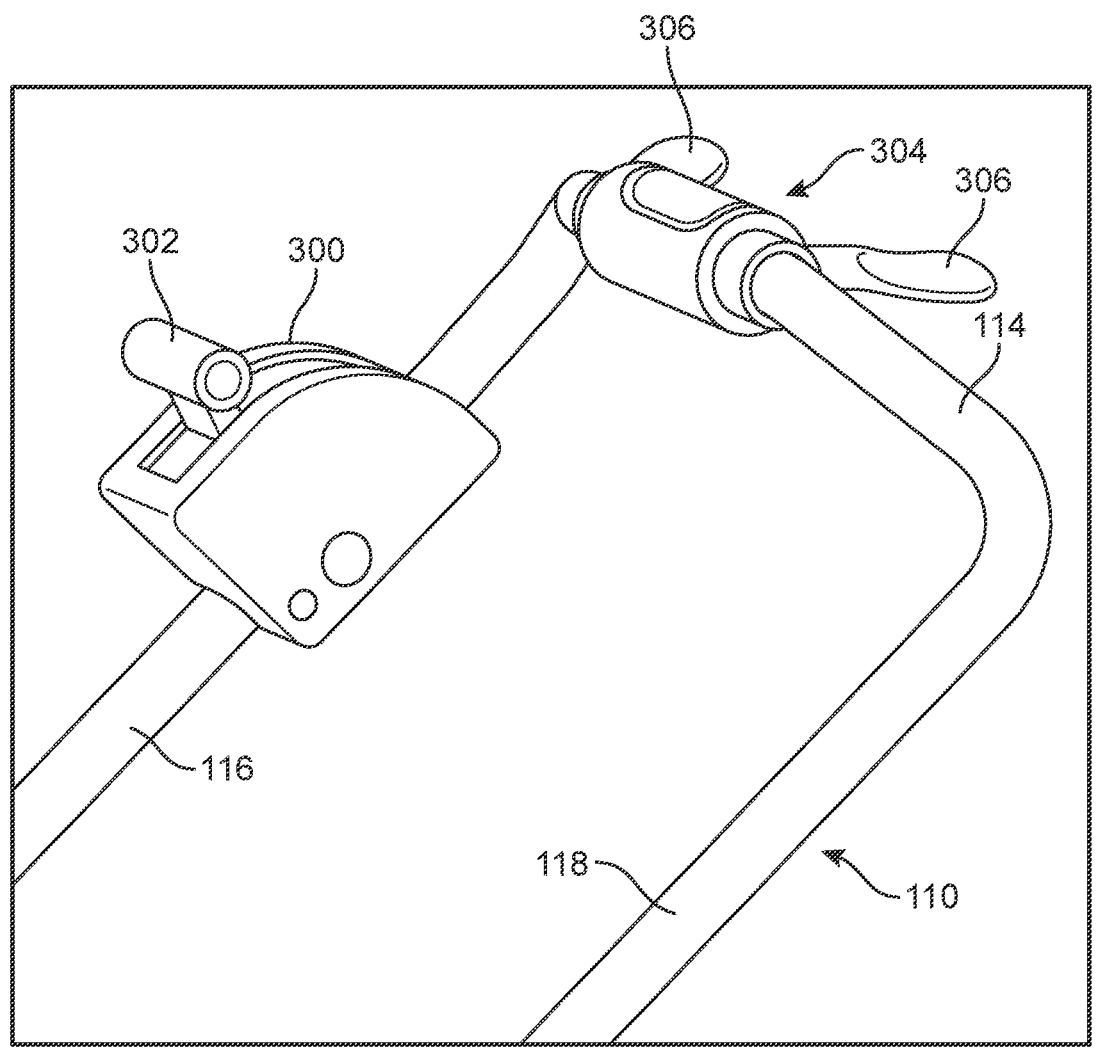
FIG. 3 is an enlarged view of a top portion of an arm assembly of the three wheeled electric cargo transporter of FIG. 1 in accordance with aspects of the present disclosure.

Referring now to FIG. 3, an enlarged view of a top portion of arm assembly 110 of three wheeled electric cargo transporter 100 of FIG. 1 is shown. In some embodiments, transporter 100 may include a throttle 300. In an example embodiment, throttle 300 is disposed on one of the pair of parallel arm bars of arm assembly 110. For example, in this embodiment, throttle 300 is disposed on first arm bar 116 at the top portion of arm assembly 110 adjacent to upper crossbar 114. In other embodiments, throttle 300 may be located on other portions of arm assembly 110, including on second arm bar 118 or upper crossbar 114. In an example embodiment, throttle 300 is in communication with electric motor 106 in hub 108 of front wheel 102. For example, throttle 300 may be in communication with electric motor 106 via a wire (not shown) or wirelessly, such as via a Bluetooth module or similar wireless communication technology. With this configuration, throttle 300 is configured to control electric motor 106 to rotate front wheel 102 and thereby control the speed of transporter 100.

In this embodiment, throttle 300 includes a lever 302 that may be moved forward (e.g., in a direction towards front wheel 102) or backwards (e.g., in a direction towards rear wheels 104). Moving lever 302 of throttle 300 in a first direction (e.g., one of forward or backwards) increases the speed of transporter 100 by increasing power to electric motor 106 to turn front wheel 102. Similarly, moving lever 302 in an opposite second direction (e.g., the other one of backwards or forward) decreases the speed of transporter 100 by reducing power to electric motor 106 to slow and/or stop front wheel 102 from turning.

In some embodiments, as noted above, electric motor 106 in hub 108 of front wheel 102 may have a regenerative braking mechanism or function. Moving lever 302 of throttle 300 in a direction to decrease the speed of transporter 100 in such embodiments also acts to apply a braking force to transporter 100 by controlling the regenerative braking mechanism or function of electric motor 106 in hub 108 of front wheel 102. With this configuration, throttle 300 may be used by a user or rider to start, drive, and stop transporter 100.

In some embodiments, transporter 100 may include provisions to accommodate hands of a user or rider. As shown in FIG. 3, upper crossbar 114 includes a handlebar 304 located approximately in the middle of upper crossbar 114. Handlebar 304 may include grips 306 that extend outward from handlebar 304 (e.g., in a direction towards rear wheels 104) and are configured to be held or grabbed by a user or rider of transporter 100. With this arrangement, a user or rider may be able to grab or hold onto handlebar 304 and/or grips 306 on upper crossbar 114 of arm assembly 110 while transporter 100 is being ridden or driven.

Figure 4:
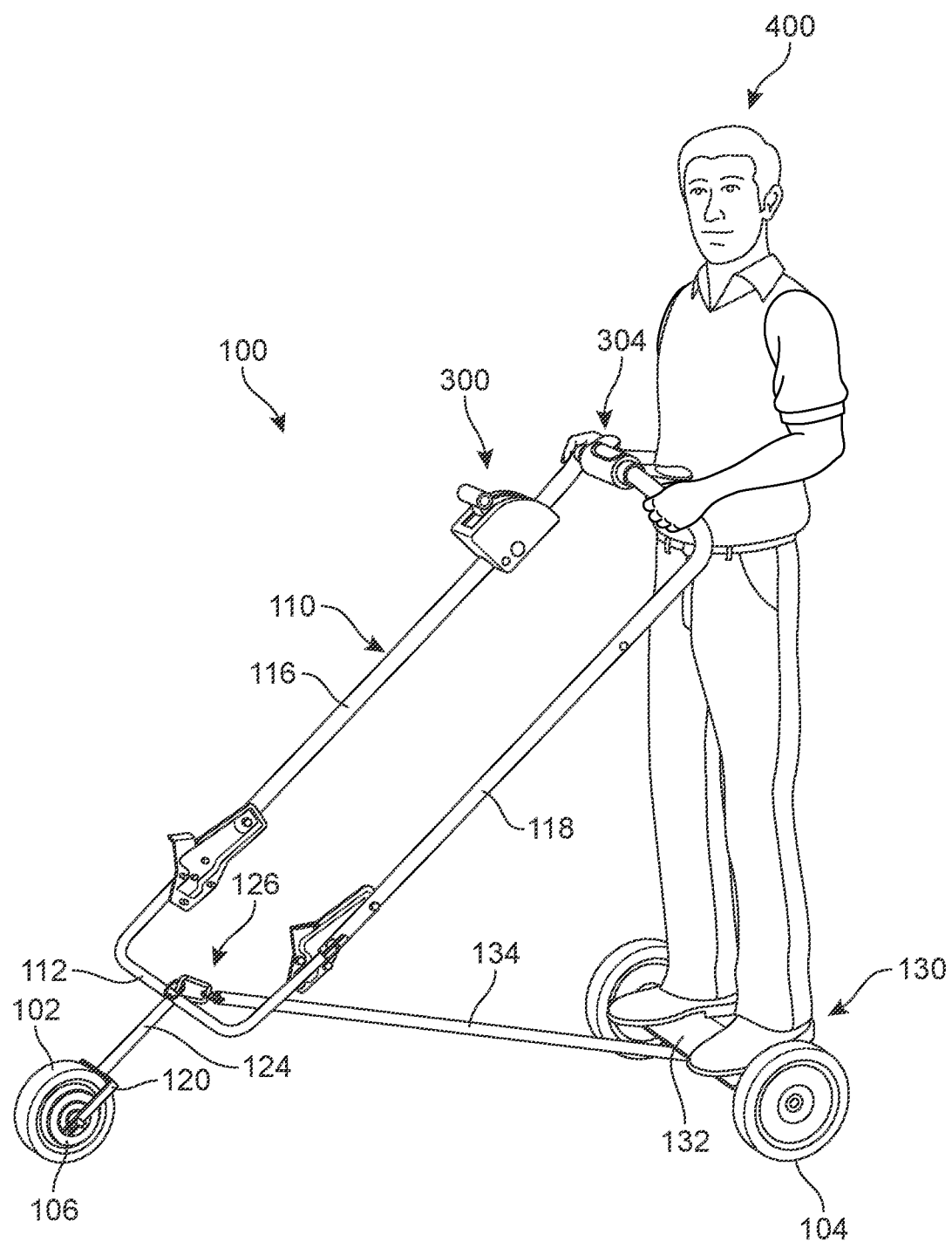
FIG. 4 is a representative view of the example embodiment of the three wheeled electric cargo transporter being ridden by a user in accordance with aspects of the present disclosure.

Referring now to FIG. 4, a representative view of the example embodiment of three wheeled electric cargo transporter 100 is shown being ridden by a rider or user 400. As shown in this embodiment, when transporter 100 is in the riding configuration, user 400 is standing on base 132 of rear platform 130 and is holding onto handlebar 304 on upper crossbar 114 of arm assembly 110. Throttle 300 is within reach of user 400 so that user 400 may control the speed of transporter 100, as described above.

Figure 5:
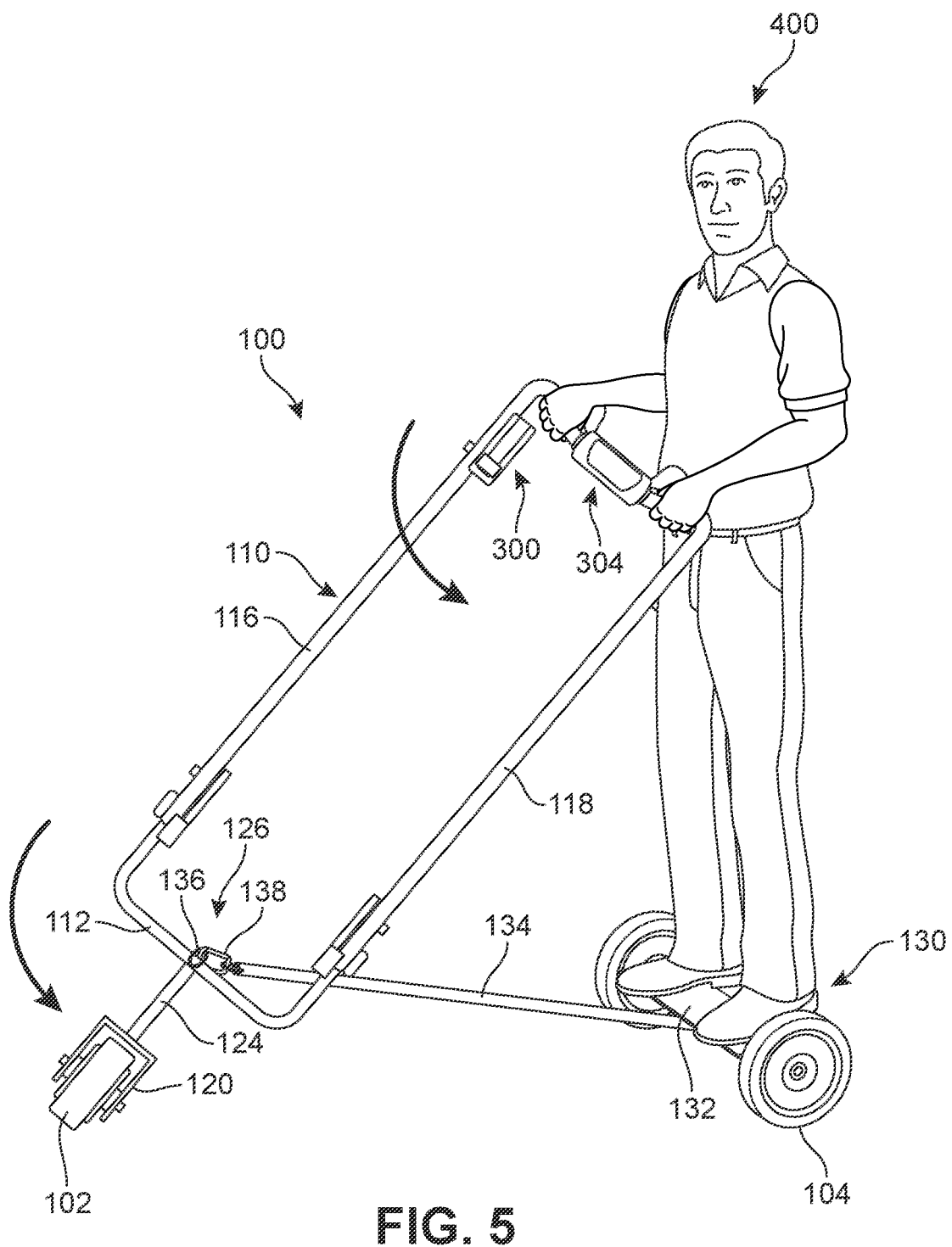
FIG. 5 is a representative view of the example embodiment of the three wheeled electric cargo transporter rotating around a connection member to turn in accordance with aspects of the present disclosure.

FIG. 5 is a representative view of the example embodiment of three wheeled electric cargo transporter 100 rotating around connection mechanism 126 to turn. In some embodiments, a user (e.g., user 400) may control the direction of transporter 100 by turning arm assembly 110. Because front wheel 102 is attached to lower crossbar 112 of arm assembly 110 by way of fork 120 and front shaft 124, turning arm assembly 110 causes front wheel 102 to turn in a corresponding direction.

As described above with reference to FIG. 2, when user 400 of transporter 100 turns arm assembly 110 to rotate front wheel 102, coupler 138 of connection mechanism 126 swivels relative to attachment member 136 so that rear platform 130 retains its initial orientation. As transporter 100 then moves forward, rear platform 130 will change orientation to follow or trail behind front wheel 102. This articulated arrangement between front wheel 102 and rear wheels 104 allows or permits transporter 100 to maneuver and turn while being driven by front wheel 102.

Figure 6:
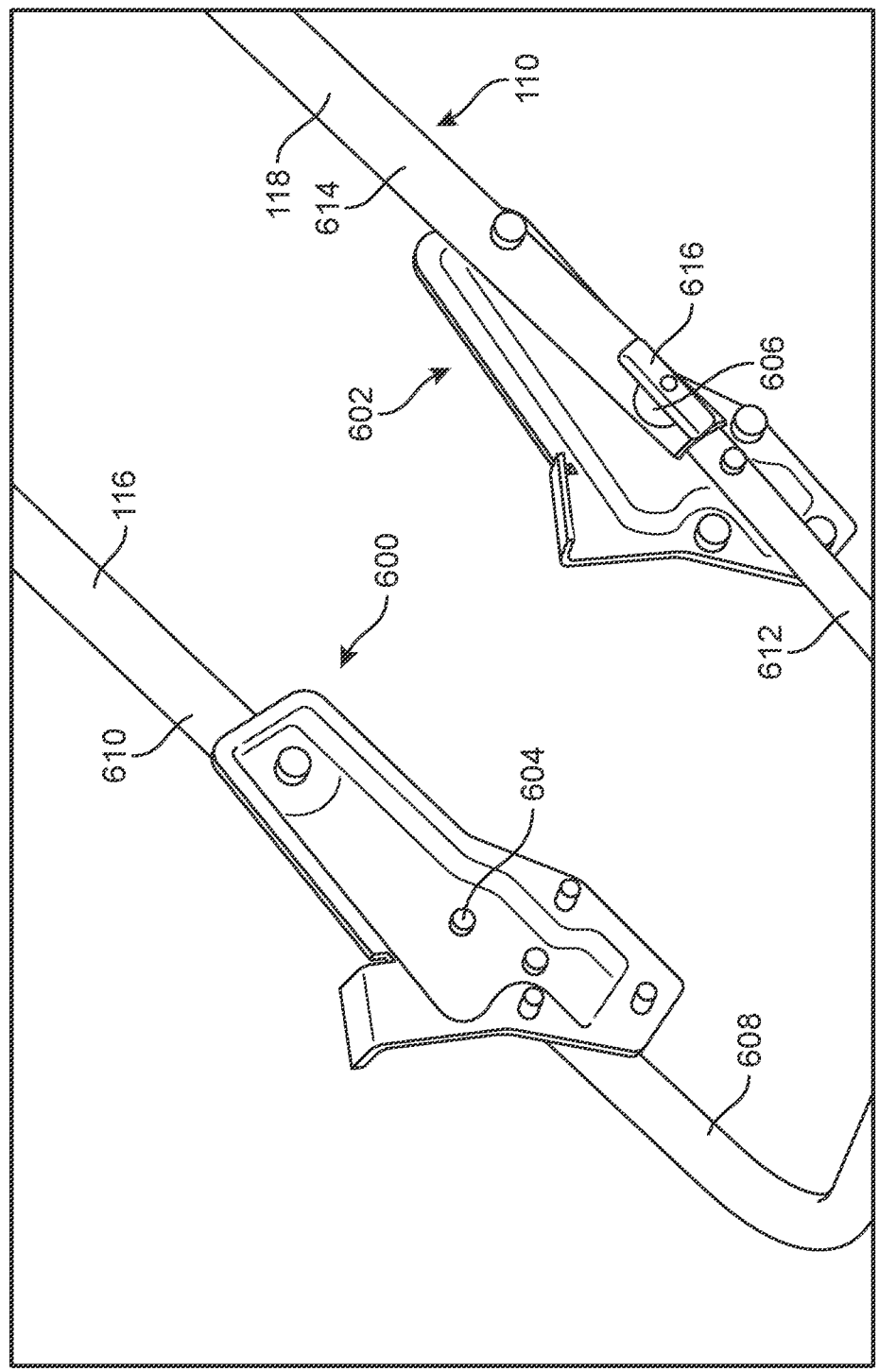
FIG. 6 is an enlarged view of a folding mechanism of the three wheeled electric cargo transporter in accordance with aspects of the present disclosure.

In some embodiments, three wheeled electric cargo transporter 100 may include components that permit transporter 100 to be folded or collapsed for storage. For example, in an example embodiment, transporter 100 may be configured to be placed in an upright storage configuration (as will be described in reference to FIGS. 7-9 below). Referring now to FIG. 6, an enlarged view of folding mechanisms of three wheeled electric cargo transporter 100 are shown according to an example embodiment. In this embodiment, arm assembly 110 of transporter 100 includes folding mechanisms on each of the pair of parallel arm bars, including a first folding mechanism 600 on first arm bar 116 and a second folding mechanism 602 on second arm bar 118 located directly opposite from first folding mechanism 600.

In an example embodiment, each of first folding mechanism 600 and second folding mechanism 602 has a substantially similar configuration that allows arm assembly 110 to fold. For example, first folding mechanism 600 on first arm bar 116 includes a first pivot point 604 and second folding mechanism 602 on second arm bar 118 includes a second pivot point 606. First folding mechanism 600 is configured so that first arm bar 116 may fold at first pivot point 604 to divide first arm bar 116 into a first portion 608 and a second portion 610 located above first portion 608. Similarly, second folding mechanism 602 is configured so that second arm bar 118 may fold at second pivot point 606 to divide second arm bar 118 into a third portion 612 and a fourth portion 614 located above third portion 612.

In some embodiments, each of first folding mechanism 600 and second folding mechanism 602 may also include a fastening element that is configured to keep the folding mechanism from folding arm assembly 110 while transporter 100 is being ridden or is not otherwise in the storage configuration. For example, in this embodiment, second folding mechanism 602 includes a first fastening element 616. First fastening element 616 retains or keeps third portion 612 and fourth portion 614 of second arm bar 118 from folding when first fastening element 616 is in a locked or tightened position. That is, when first fastening element 616 is in a locked or tightened position, third portion 612 and fourth portion 614 of second arm bar 118 are continuous and aligned with each other so that second arm bar 118 has a substantially straight arrangement.

In an example embodiment, first fastening element 616 may have a T-bar or similar handle that allows a user or rider (e.g., user 400) to easily twist or turn first fastening element 616 in one direction to tighten it to the locked or tightened position (e.g., a clockwise direction) and to turn it in the opposite direction to loosen it to an unlocked or loosened position (e.g., a counter-clockwise direction). Once first fastening element 616 is in the unlocked or loosened position, then second arm bar 118 may be folded at second pivot point 606 of second folding mechanism 602 so that third portion 612 and fourth portion 614 are at an angle with respect to each other and second arm bar 118 no longer has a substantially straight arrangement (i.e., having a folded arrangement instead).

It should be understood that first folding mechanism 600 also includes a fastening element having a substantially similar configuration as first fastening element 616 that may be transitioned between a locked or tightened position and an unlocked or loosened position by turning or twisting the fastening element. With this arrangement, first portion 608 and second portion 610 of first arm bar 116 may be converted from being continuous and aligned with each other so that first arm bar 116 has a substantially straight arrangement (i.e., when the fastening element is in the locked or tightened position) to a folded arrangement so that first portion 608 and second portion 610 at an angle with respect to each other and first arm bar 116 no longer has a substantially straight arrangement (i.e., when the fastening element is in the unlocked or loosened position).

Figure 7:
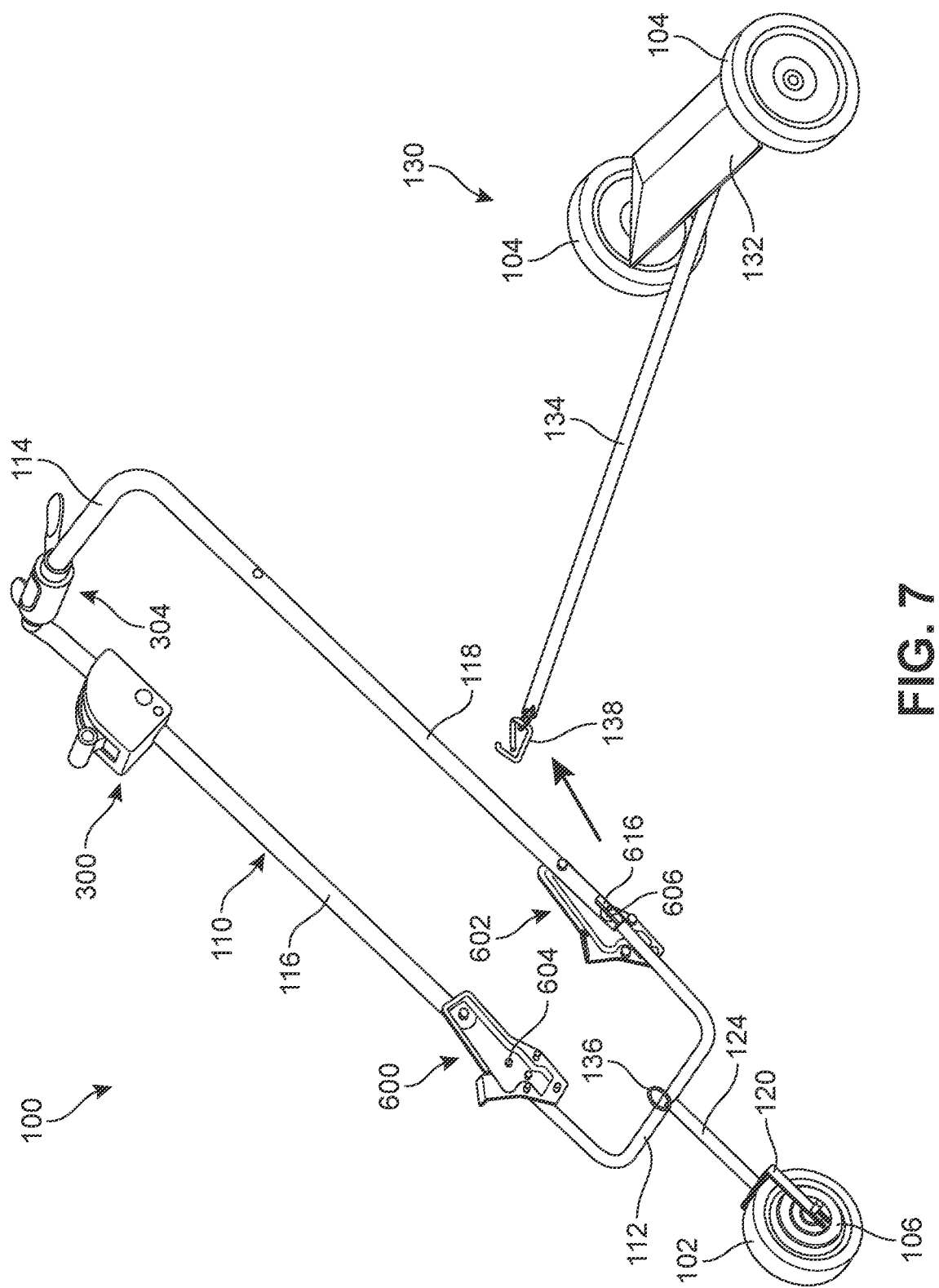
FIG. 7 is a representative view of a process of converting the three wheeled electric cargo transporter to a storage configuration in accordance with aspects of the present disclosure.
Figure 8:
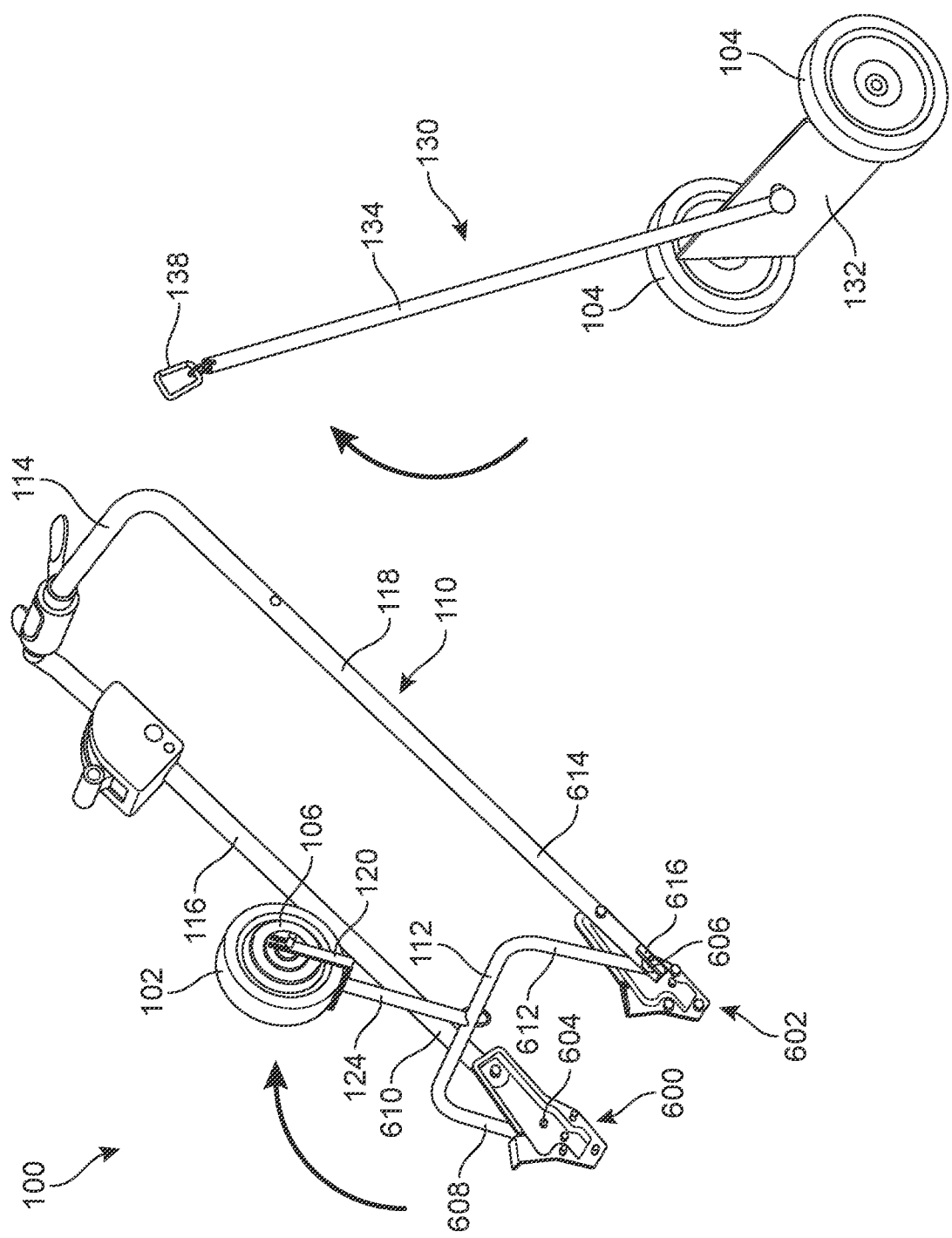
FIG. 8 is a representative view of folding the three wheeled electric cargo transporter in accordance with aspects of the present disclosure.

FIGS. 7 and 8 illustrate an exemplary process of converting three wheeled electric cargo transporter 100 from the riding configuration (shown in FIG. 1) to a storage configuration. Referring now to FIG. 7, the exemplary process of converting transporter 100 to the storage configuration is shown. In this embodiment, rear platform 130 of transporter 100 is separated from arm assembly 110. In an example embodiment, coupler 138 of connection mechanism 126 is disconnected from attachment member 136 on lower crossbar 112 of arm assembly 110 to remove or separate rear platform 130, including trailing shaft 134, base 132, and rear wheels 104, from arm assembly 110. With this arrangement, transporter 100 may be separated into a first portion (e.g., including front wheel 102 and arm assembly 110) and a second portion (e.g., rear platform 130, including trailing shaft 134, base 132, and rear wheels 104) by releasing connection member 126.

Next, FIG. 8 illustrates folding arm assembly 110 as part of the exemplary process of converting transporter 100 to the storage configuration. Once rear platform 130 is separated from arm assembly 110 (as shown in FIG. 7), arm assembly 110 may be folded using first folding mechanism 600 and second folding mechanism 602. As described above, each folding mechanism includes a fastening element that may be twisted or turned between a tightened or locked position and a loosened or unlocked position. In this embodiment, first fastening element 616 of second folding mechanism 602 is turned to the loosed or unlocked position so that second arm bar 118 may be folded at second pivot point 606. Similarly, the fastening element of first folding mechanism 600 may also be turned to the loosed or unlocked position so that first arm bar 116 may be folded at first pivot point 604.

As shown in FIG. 8, first arm bar 116 is folded by way of first folding mechanism 600 such that first portion 608 and second portion 610 are at an angle with respect to each other. Second arm bar 118 is also folded by way of second folding mechanism 602 such that third portion 612 and fourth portion 614 are at an angle with respect to each other. In addition, by folding arm assembly 110, front wheel 102, front shaft 124, and lower crossbar 112 are moved upwards towards upper crossbar 114. That is, when arm assembly 110 is folded, each of front wheel 102, front shaft 124, and lower crossbar 112 are located above first folding mechanism 600 and second folding mechanism 602. The folded arm assembly 110 may then be stacked onto rear platform 130 in an upright position. With this arrangement, transporter 100 may be converter to a storage configuration that takes up less space than the riding configuration.

Figure 9:
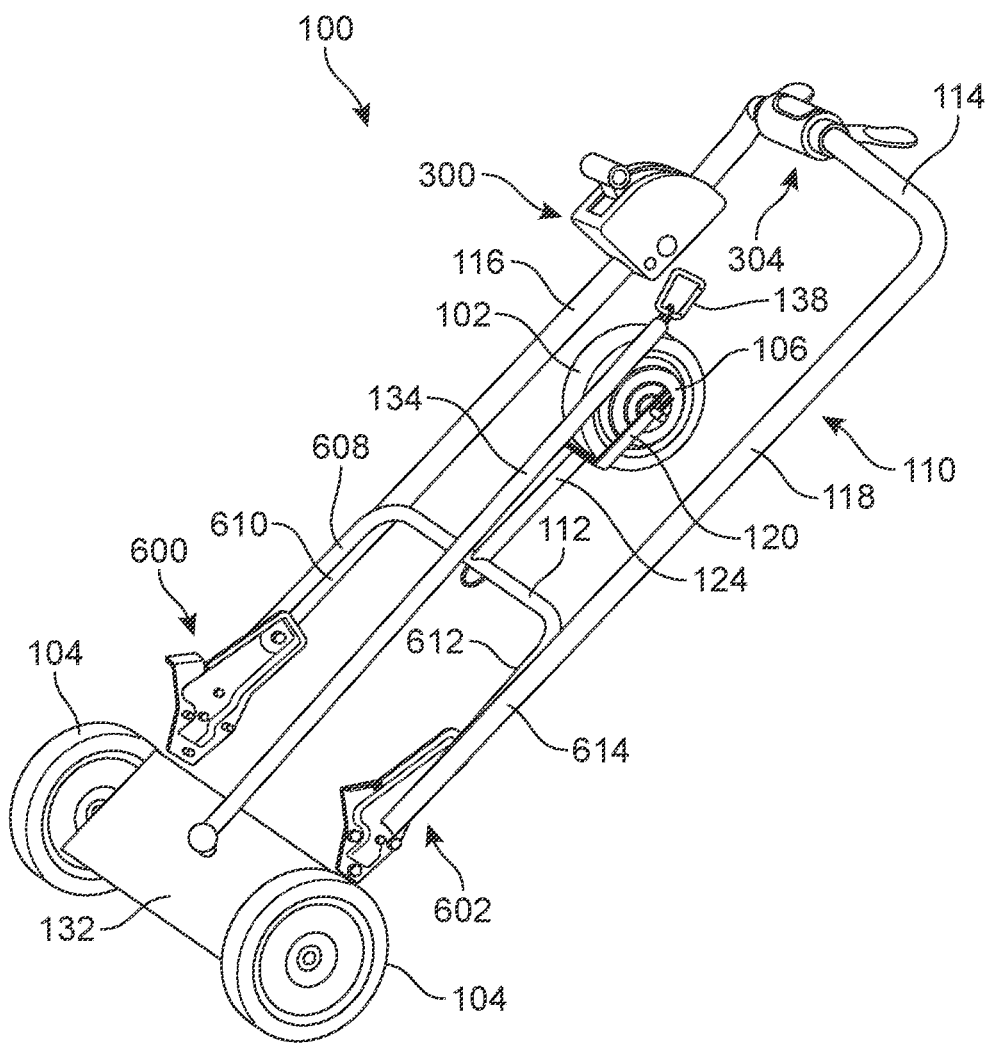
FIG. 9 is a representative view of the three wheeled electric cargo transporter in an upright storage configuration in accordance with aspects of the present disclosure.

For example, as shown in FIG. 9, three wheeled electric cargo transporter 100 is in an upright storage configuration. In the upright storage configuration, rear wheels 104 and base 132 of rear platform 130 are located at the bottom and front wheel 102 is located near the top, adjacent to upper crossbar 114 and handlebar 304. In addition, trailing shaft 134 extends vertically upwards from base 132 of rear platform 130 such that coupler 138 at the end of trailing shaft 134 is also located near the top, adjacent to upper crossbar 114 and handlebar 304. With this arrangement, transporter 100 in the upright storage configuration is substantially vertically oriented so that transporter 100 takes up less space and may be easily and conveniently kept out of the way until needed. The process of FIGS. 7-9 may be performed in the reverse order to transition or convert transporter 100 back from the upright storage configuration to the riding configuration shown in FIG. 1.

Figure 10A:
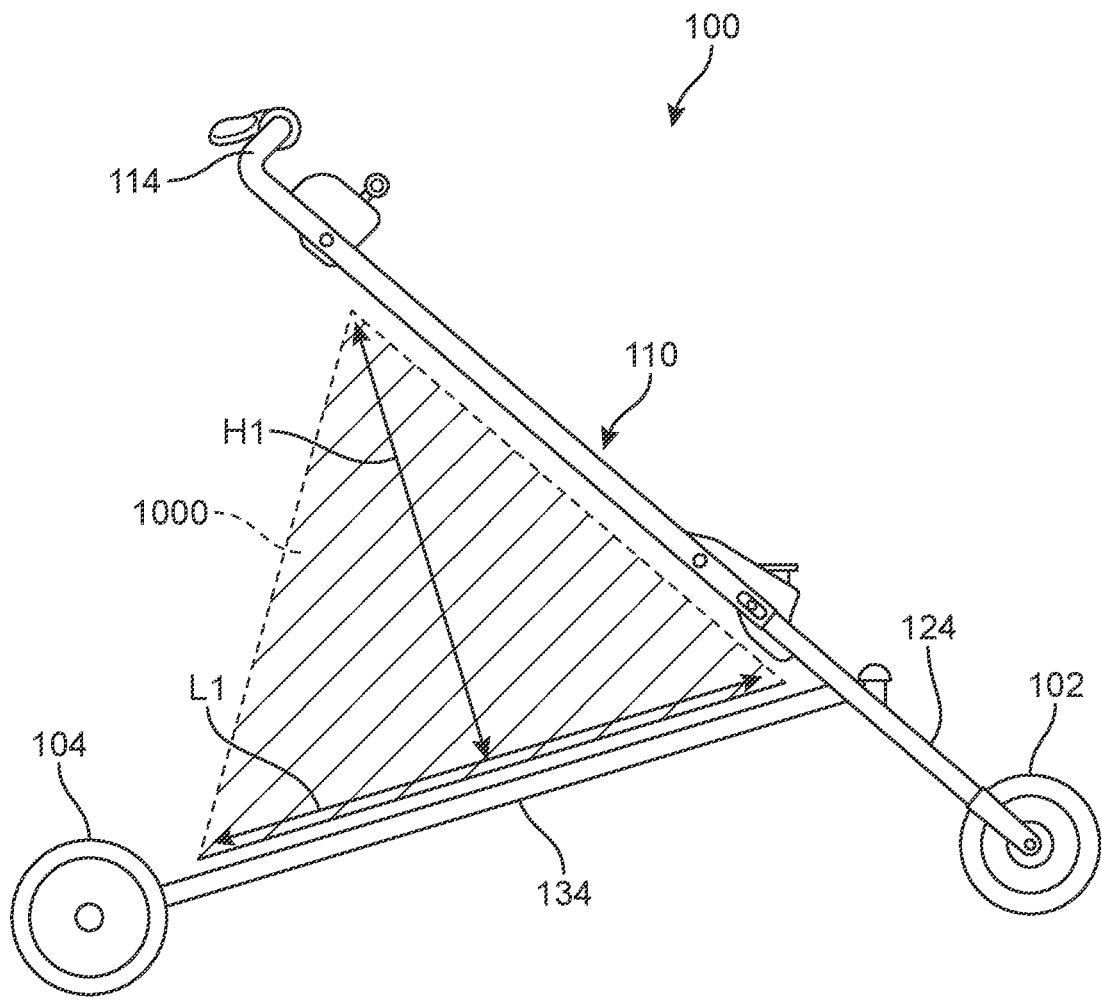
FIG. 10A is a schematic side view of a cargo area of the three wheeled electric cargo transporter in accordance with aspects of the present disclosure.
Figure 10B:
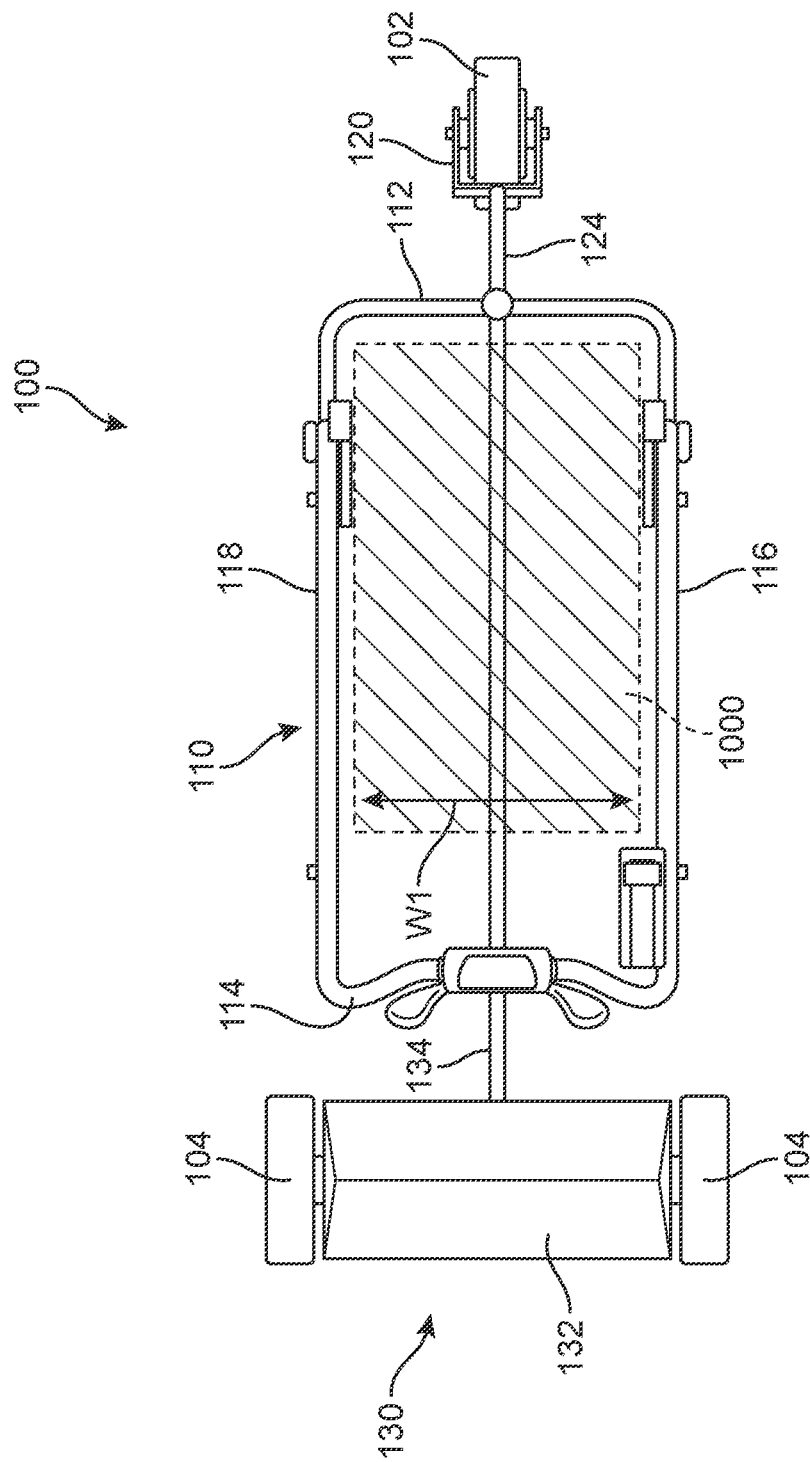
FIG. 10B is a schematic top view of the cargo area of the three wheeled electric cargo transporter in accordance with aspects of the present disclosure.

In some embodiments, transporter 100 is configured to haul or carry cargo of various types. FIGS. 10A and 10B illustrate schematic views of a cargo area 1000 of transporter 100. FIG. 10A is a schematic side view of cargo area 1000 of transporter 100. In this embodiment, cargo area 1000 extends at least along a length L1 of trailing shaft 134. Cargo area 1000 also extends at least a height H1 from trailing shaft 134 upwards towards the top portion of arm assembly 110 (e.g., near upper crossbar 114). FIG. 10B is a schematic top view of cargo area 1000 of transporter 100. In this embodiment, cargo area 1000 extends at least a width W1 between the pair of parallel arm bars of arm assembly 110 (e.g., first arm bar 116 and second arm bar 118). As shown in FIG. 10B, width W1 is less than a distance D1 between rear wheels 104.

In one embodiment, length L1 of trailing shaft 134 is approximately 1.25 meters, height H1 is approximately 0.7 meters, and width W1 is approximately 0.5 meters. In some embodiments, length L1 of trailing shaft 134 may be in a range between 1 meter to 1.5 meters, height H1 may be in a range between 0.5 meters to 1 meter, and width W1 may be in a range between 0.35 and 0.7 meters. Taken together, these dimensions provide an example of the approximate size of cargo area 1000 of transporter 100. It should be understood, however, that objects or cargo may extend beyond the limits of cargo area 1000 in some cases.

Figure 11:
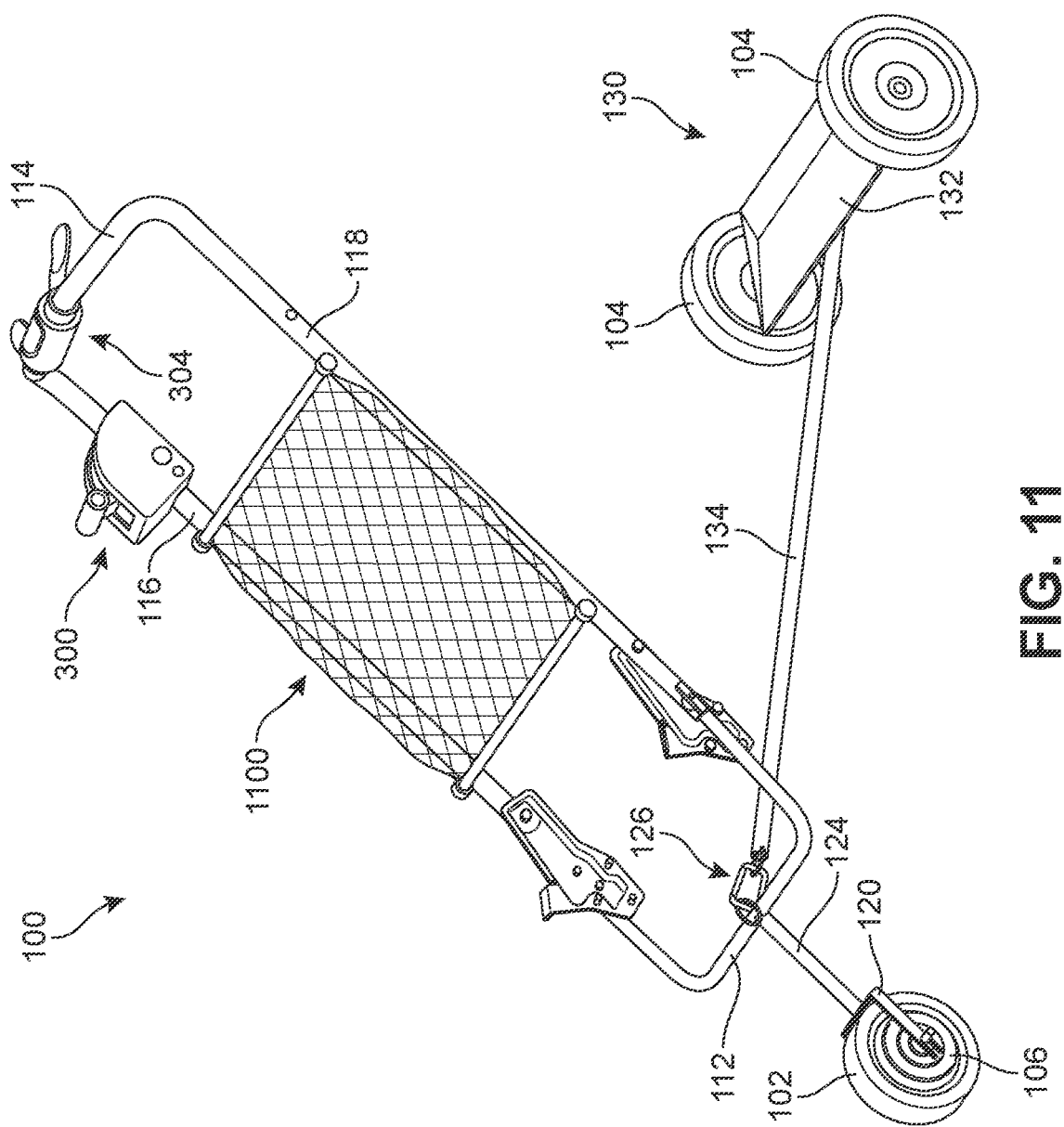
FIG. 11 is a representative isometric view of a cargo net used with the three wheeled electric cargo transporter in accordance with aspects of the present disclosure.

In some embodiments, transporter 100 may also include other components or accessories configured to assist a user or rider with carrying cargo on transporter 100. Referring now to FIG. 11, a representative isometric view of a cargo net 1100 used with three wheeled electric cargo transporter 100 is shown. In this embodiment, cargo net 1100 may be disposed between the pair of parallel arm bars (e.g., first arm bar 116 and second arm bar 118). For example, as shown in FIG. 11, cargo net 1100 is attached along side to first arm bar 116 and at the opposite side to second arm bar 118. With this arrangement, cargo net 1100 allows a user or rider of transporter 100 to carry or haul cargo that may be too small or oddly shaped to sit within cargo area 1000 shown in FIGS. 10A and 10B.

In the illustrated embodiments, attachment member 136 of connection mechanism 126 is shown in the form of a ring or loop that is fixedly attached to the top side of lower crossbar 112 and coupler 138 of connection mechanism 126 is shown in the form of a carabiner or snap ring that removably attaches or connects to the ring or loop. In other embodiments, connection mechanism 126 may include different components that are configured to removably attach or connect rear platform 130 to arm assembly 110.

Figure 12:
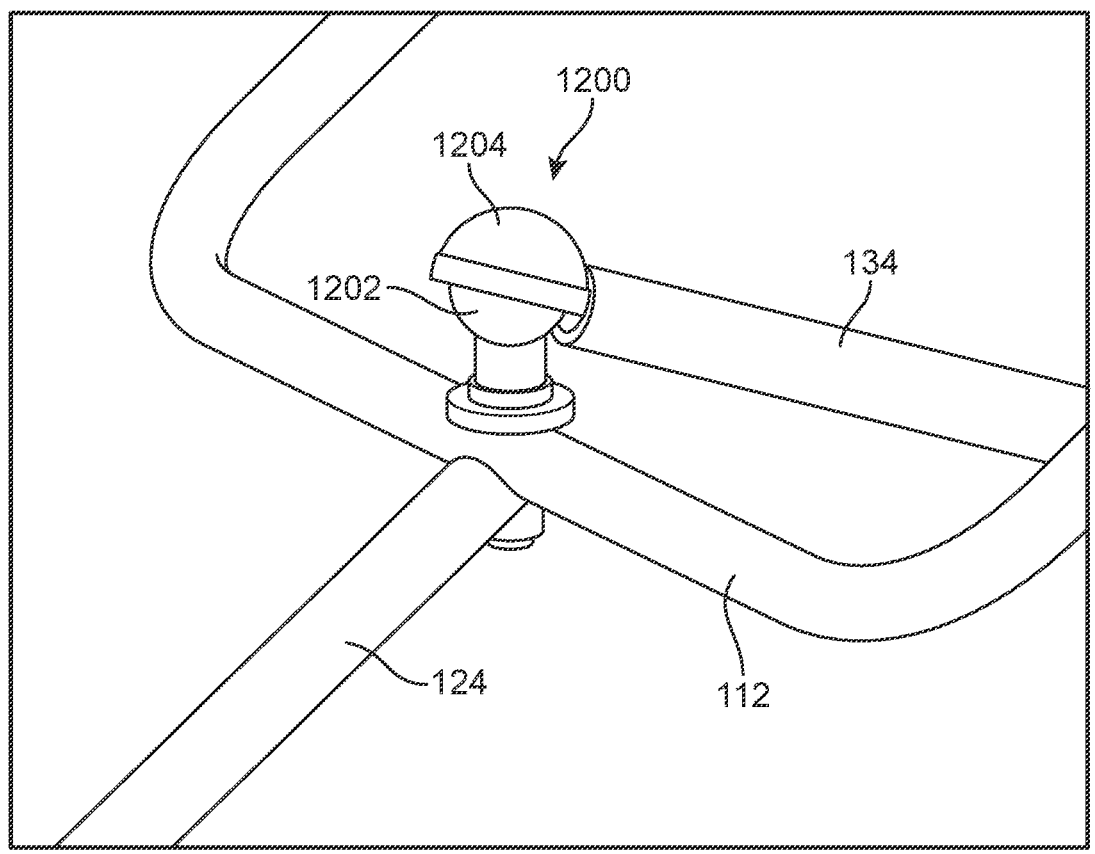
FIG. 12 is an enlarged view of an alternate embodiment of a connection member for the three wheeled electric cargo transporter in accordance with aspects of the present disclosure.

Referring now to FIG. 12, an enlarged view of an alternate embodiment of a connection mechanism 1200 for three wheeled electric cargo transporter 100 is shown. In this embodiment, connection mechanism 1200 is in the form of a ball hitch that includes a ball 1202 that is located on a top side of lower crossbar 112 opposite front shaft 124 and a receiving coupler 1204 that is disposed at an end of trailing shaft 134 opposite from base 132 of rear platform 130. Receiving coupler 1204 includes a concave recess or cavity that is shaped and sized to fit onto or over ball 1202. Compared with attachment member 136 and coupler 138 of connection mechanism 126, connection mechanism 1200 is configured to withstand heavier weights of cargo on transporter 100. That is, connection mechanism 1200 is configured for heavy-duty cargo applications that may not be suitable for connection mechanism 126.

It should be understood that other types or forms of connection mechanisms may be provided to removably connect or attach arm assembly 110 and rear platform 130 of transporter 100 in accordance with the principles of the example embodiments described herein.

Figure 13:
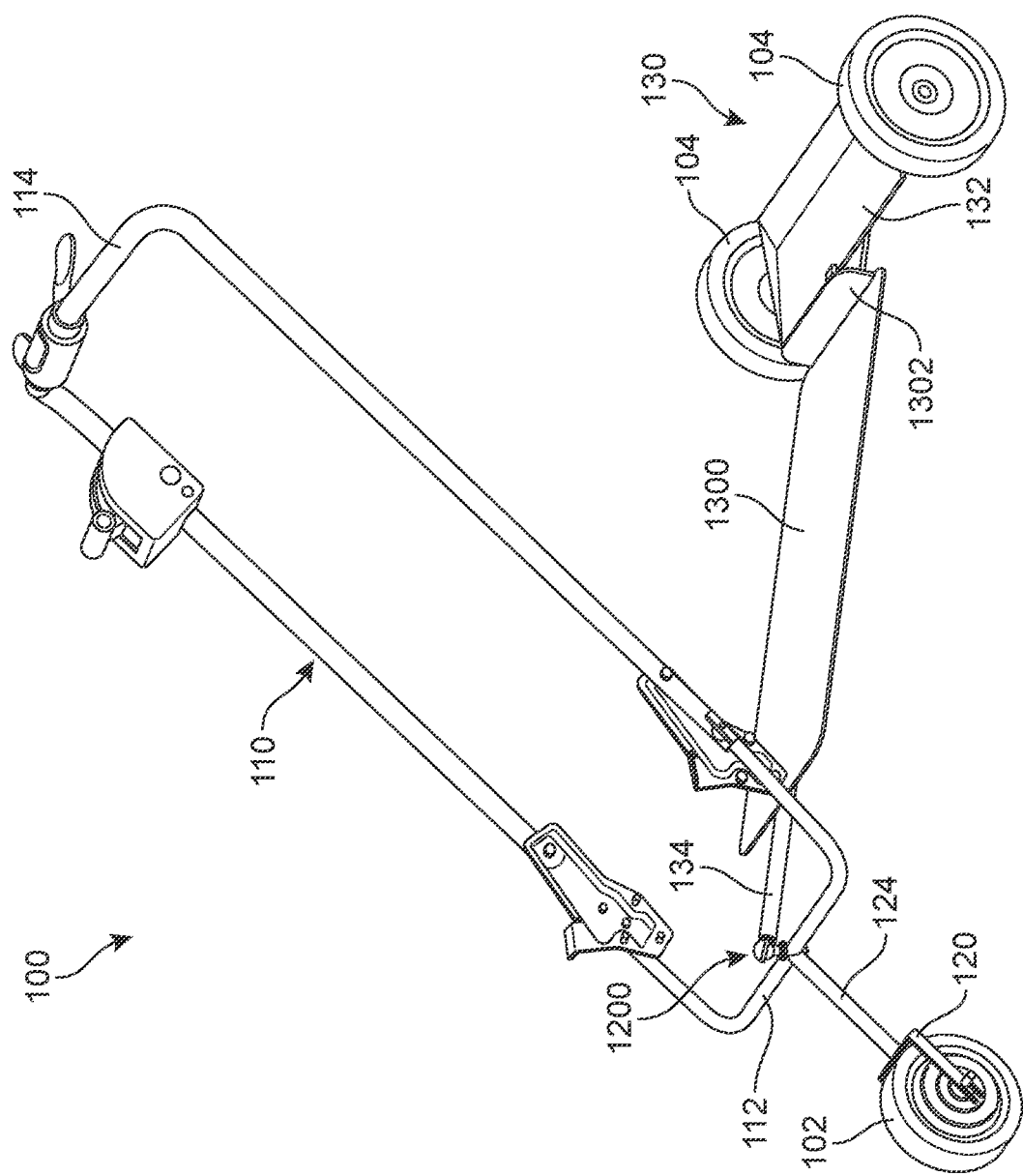
FIG. 13 is an isometric view of a three wheeled electric cargo transporter with a cargo platform in accordance with aspects of the present disclosure.

In some embodiments, a three wheeled electric cargo transporter (e.g., transporter 100) may be provided with components configured to haul or carry larger and/or heavier objects or items. For example, referring to FIG. 13, in this embodiment, transporter 100 includes a cargo platform 1300. In some embodiments, cargo platform 1300 may be a substantially rectangular plate or panel that is attached or connected on top of trailing shaft 134 of rear platform 130. As shown in FIG. 13, cargo platform 1300 extends rearward from connection mechanism 1200 towards base 132 of rear platform 130 on top of trailing shaft 134. Cargo platform 1300 is configured to accommodate large and/or heavy objects on transporter 100, such as luggage, large boxes, crates, etc.

Additionally, in some embodiments, cargo platform 1300 may be provided with components configured to assist with preventing or stopping objects or items from falling or sliding off of cargo platform 1300. For example, in one embodiment, cargo platform 1300 includes a retaining lip 1302. As shown in FIG. 13, retaining lip 1302 is located at the rear end of cargo platform 1300 adjacent to base 132 of rear platform 130. In an example embodiment, retaining lip 1302 is a raised wall or barrier that extends approximately perpendicular from the surface of cargo platform 1300. With this arrangement, retaining lip 1302 is configured to prevent or stop objects or items placed on cargo platform 1300 from sliding backwards into a user or rider on base 132 of rear platform 130 or falling off of transporter 100. In addition, in some embodiments, the surface of cargo platform 1300 may be provided with a non-slip or textured surface to further assist with retaining objects or items from falling or sliding off of cargo platform 1300.

Figure 14:
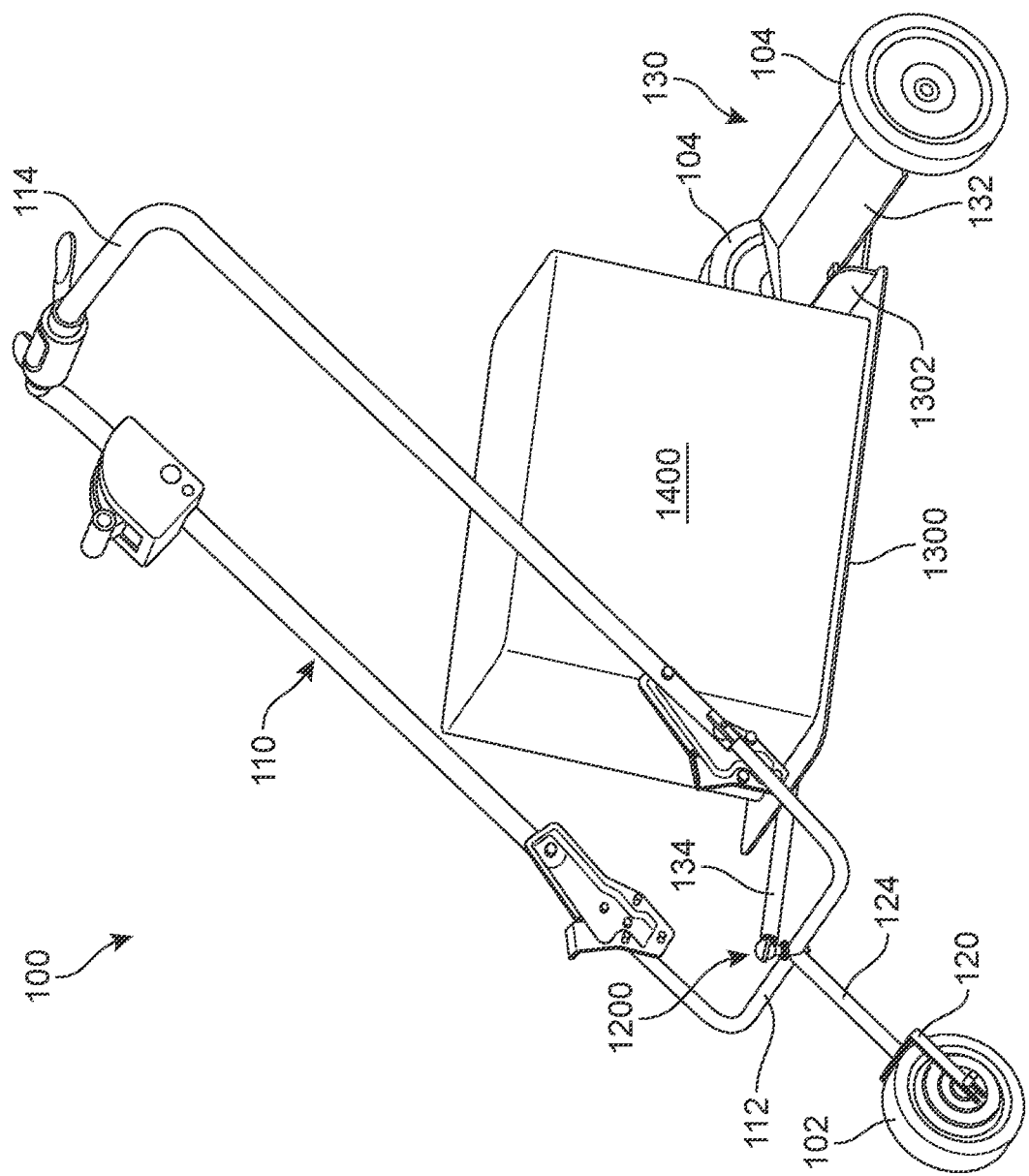
FIG. 14 is a representative view of the three wheeled electric cargo transporter with a cargo platform hauling cargo in accordance with aspects of the present disclosure.

Referring now to FIG. 14, an example embodiment of transporter 100 with cargo platform 1300 is shown. In this embodiment, transporter 100 is shown hauling or carrying a large object 1400. For example, large object 1400 may be luggage, a crate, a box, or some other item that may be too large to balance on trailing shaft 134 or to carry using cargo net 1100 (e.g., as shown in FIG. 11). As shown in FIG. 14, large object 1400 is disposed on top of cargo platform 1300. When large object 1400 is on cargo platform 1300, a user or rider of transporter 100 may still ride transporter 100 by standing on base 132 of rear platform 130. With this arrangement, cargo platform 1300 may allow transporter 100 to carry or haul larger objects.

Additionally, in some embodiments, transporter 100 with cargo platform 1300 may be used in combination with the alternate embodiment of the connection mechanism shown in FIG. 12 above (e.g., connection mechanism 1200). Connection mechanism 1200 in the form of a ball hitch, including ball 1202 and receiving coupler 1204, may be provided to allow transporter 100 to haul or carry heavier objects or items (e.g., large object 1400) when used with cargo platform 1300. In other embodiments, different connection mechanisms, including connection mechanism 126, may be used.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An electric cargo transporter comprising:
a front wheel including an electric motor inside a hub of the front wheel;
a rear platform including a base and a pair of rear wheels;
an arm assembly including a pair of parallel arm bars, a lower crossbar, and an upper crossbar; and
a trailing shaft connected to the base of the rear platform at a first end and connected to the lower crossbar of the arm assembly at an opposite second end;
wherein the trailing shaft is connected to the lower crossbar at the second end via a connection mechanism that removably attaches the trailing shaft to the arm assembly;
wherein the connection mechanism comprises an attachment member located on a top side of the lower crossbar and a coupler that is disposed at the second end of the trailing shaft; and
wherein the connection mechanism is articulated so that the coupler rotates relative to the attachment member to allow the rear platform to pivot relative to the arm assembly.

2. The electric cargo transporter according to claim 1, wherein the electric motor includes a regenerative braking function.

3. The electric cargo transporter according to claim 1, further comprising a cargo net disposed between the pair of parallel arm bars.

4. The electric cargo transporter according to claim 1, wherein the attachment member comprises a ring or loop; and
wherein the coupler comprises a carabiner.

5. The electric cargo transporter according to claim 1, wherein the attachment member comprises a ball; and
wherein the coupler comprises a receiving coupler having a recess shaped and sized to fit over the ball.

6. The electric cargo transporter according to claim 1, wherein the trailing shaft is configured to pivot at the connection mechanism when the front wheel is turned.

7. The electric cargo transporter according to claim 1, further comprising:
a fork attached to an axle of the front wheel;
a front shaft attached to the fork at one end and attached to a bottom side of the lower crossbar at an opposite end.

8. The electric cargo transporter according to claim 1, further comprising:
a folding mechanism disposed on each of the pair of parallel arm bars.

9. An electric cargo transporter comprising:
a first portion comprising a front wheel including an electric motor inside a hub of the front wheel and an arm assembly including a pair of parallel arm bars, a lower crossbar, and an upper crossbar;
a second portion comprising a rear platform including a base, a pair of rear wheels, and a trailing shaft; and
a connection mechanism attaching the first portion to the second portion, wherein the first portion is removably connected to the second portion at the connection mechanism;

wherein the connection mechanism comprises an attachment member located on a top side of the lower crossbar and a coupler that is disposed at an end of the trailing shaft;

wherein the electric cargo transporter is articulated at the connection mechanism between the first portion and the second portion so that the coupler rotates relative to the attachment member to allow the first portion to pivot relative to the second portion.

10. The electric cargo transporter according to claim 9, further comprising a cargo net disposed between the pair of parallel arm bars.

11. The electric cargo transporter according to claim 9, further comprising a throttle disposed on one of the parallel arm bars that is in communication with the electric motor to control a speed of the electric cargo transporter.

12. The electric cargo transporter according to claim 9, wherein the attachment member comprises a ring or loop; and wherein the coupler comprises a carabiner.

13. The electric cargo transporter according to claim 9, wherein the attachment member comprises a ball; and wherein the coupler comprises a receiving coupler having a recess shaped and sized to fit over the ball.

14. The electric cargo transporter according to claim 9, further comprising a folding mechanism disposed on each of the pair of parallel arm bars;

wherein the folding mechanism includes a pivot point; and wherein the arm assembly is configured to fold at the pivot point.

15. The electric cargo transporter according to claim 14, the pair of parallel arm bars comprising a first arm bar and a second arm bar disposed opposite the first arm bar;

wherein the first arm bar folds at a first pivot point to divide the first arm bar into a first portion and a second portion located above the first portion;

wherein the second arm bar folds at a second pivot point to divide the second arm bar into a third portion and a fourth portion located above third portion.

16. The electric cargo transporter according to claim 9, further comprising a cargo platform on the trailing shaft.

17. An electric cargo transporter configured to be transitioned between a riding configuration and a storage configuration, the electric cargo transporter comprising:

a front wheel including an electric motor inside a hub of the front wheel;

a rear platform including a base and a pair of rear wheels;

an arm assembly including a pair of parallel arm bars, a lower crossbar, and an upper crossbar; and a trailing shaft connected to the base of the rear platform at a first end and connected to a connection mechanism on the arm assembly at an opposite second end when the electric cargo transporter is in a riding configuration, wherein the connection mechanism removably attaches the trailing shaft to the arm assembly;

wherein the connection mechanism comprises an attachment member located on a top side of the lower crossbar and a coupler that is disposed at an end of the trailing shaft;

wherein the electric cargo transporter is articulated at the connection mechanism between the rear platform and the arm assembly so that the coupler rotates relative to the attachment member to allow the rear platform to pivot relative to the arm assembly.

18. The electric cargo transporter according to claim 17, wherein the trailing shaft is configured to be removed from the connection mechanism when the electric cargo transporter is in a storage configuration.

19. The electric cargo transporter according to claim 18, further comprising a folding mechanism disposed on each of the pair of parallel arm bars;

wherein the folding mechanism includes a pivot point; and wherein the arm assembly is configured to fold at the pivot point when the electric cargo transporter is in the storage configuration.

20. The electric cargo transporter according to claim 19, wherein the storage configuration is an upright storage configuration such that electric cargo transporter is vertically oriented with the folded arm assembly stacked onto the rear platform.

* * * * *